United States Patent
Ludwig et al.

(10) Patent No.: US 10,999,557 B2
(45) Date of Patent: May 4, 2021

(54) REDUNDANT ARRAY OF INEXPENSIVE CAMERAS

(71) Applicant: Xevo Inc., Bellevue, WA (US)

(72) Inventors: John Ludwig, Bellevue, WA (US); Richard Tong, Seattle, WA (US)

(73) Assignee: XEVO INC., Bellevue, WA (US)

( * ) Notice: Subject to any disclaimer, the term of this patent is extended or adjusted under 35 U.S.C. 154(b) by 38 days.

(21) Appl. No.: 16/418,771

(22) Filed: May 21, 2019

(65) Prior Publication Data

US 2019/0273892 A1  Sep. 5, 2019

Related U.S. Application Data

(63) Continuation of application No. 14/296,424, filed on Jun. 4, 2014, now Pat. No. 10,298,885.

(60) Provisional application No. 61/830,893, filed on Jun. 4, 2013.

(51) Int. Cl.
*H04N 7/18* (2006.01)
*H04N 5/232* (2006.01)

(52) U.S. Cl.
CPC ............ *H04N 7/181* (2013.01); *H04N 5/232* (2013.01)

(58) Field of Classification Search
CPC .... H04N 7/181; H04N 5/232; H04N 5/23296; H04N 5/23299
See application file for complete search history.

(56) References Cited

U.S. PATENT DOCUMENTS

| | | | |
|---|---|---|---|
| 9,253,397 B2 * | 2/2016 | Lee | H04N 5/23232 |
| 2006/0005136 A1 * | 1/2006 | Wallick | H04M 9/082 |
| | | | 715/726 |
| 2006/0136972 A1 * | 6/2006 | Metzger | G08B 13/19689 |
| | | | 725/105 |
| 2008/0126533 A1 * | 5/2008 | Klein | G06K 9/00624 |
| | | | 709/224 |
| 2008/0211929 A1 * | 9/2008 | Uchihara | H04N 5/23206 |
| | | | 348/231.99 |
| 2010/0002071 A1 * | 1/2010 | Ahiska | H04N 5/217 |
| | | | 348/36 |
| 2011/0234807 A1 * | 9/2011 | Jones | H04N 5/2258 |
| | | | 348/159 |
| 2013/0147901 A1 * | 6/2013 | Weiser | H04L 65/1053 |
| | | | 348/14.08 |
| 2013/0222599 A1 * | 8/2013 | Shaw | G06K 9/60 |
| | | | 348/159 |
| 2014/0245367 A1 * | 8/2014 | Sasaki | H04N 5/6175 |
| | | | 725/109 |
| 2014/0270706 A1 * | 9/2014 | Pasko | H04N 21/41407 |
| | | | 386/278 |
| 2015/0121252 A1 * | 4/2015 | Yerli | H04L 65/60 |
| | | | 715/753 |

OTHER PUBLICATIONS

U.S. Appl. No. 62/007,006, filed Jun. 3, 2014, 16 pages.

* cited by examiner

*Primary Examiner* — Nhan T Tran
(74) *Attorney, Agent, or Firm* — Seed IP Law Group LLP

(57) ABSTRACT

A system includes a plurality of cameras each enabled to operate independently of the others as a component camera. The system includes logic operable to form the component cameras into a network operable as a single federated camera device. The lens types of the component cameras are non-heterogeneous, and the federated camera forms a virtual lens comprising characteristics combining the lens types of the component cameras.

19 Claims, 17 Drawing Sheets

REDUNDANT ARRAY OF INEXPENSIVE CAMERAS

CROSS-REFERENCE TO RELATED APPLICATIONS

This continuation application claims priority to U.S. application Ser. No. 14/296,424, filed on Jun. 4, 2014, which claims priority to U.S. application No. 61/830,893, filed on Jun. 4, 2013, each of which is incorporated by reference herein in its entirety.

BACKGROUND OF THE INVENTION

Most surveillance cameras today are large, expensive, fixed in location and with large numbers of mechanical parts prone to failure. A Pan/Tilt/Zoom (PTZ) camera can cost $1600 for a modest quality unit, and $3500 for a unit with good specifications. These systems have relatively small processors in them that mainly compress raw photos or produce raw video streams to be sent out as files or stored in local flash. These systems are similar to the mechanically steered radar antennas of the 1960s or the very complex computer disk storage systems of the 1980s in that they are large and complex devices.

The surveillance camera sensors have grown in resolution due to Moore's law, with 1-2 megapixel video surveillance cameras available on the market today. A new class of sensors are now available from the consumer electronics world. These sensors are much higher volume and therefore cheaper and much higher resolution. Low cost sensors are available at 16-24 megapixels with 36 megapixel sensors on the way. These sensors are paired with low-cost, high-volume lenses that give much higher resolutions than conventional video cameras. These new classes of sensors are much higher performance and can allow very high resolution photos to be taken at 5-10 frames per second.

Network bandwidth has not kept pace with these improvements though, and it is difficult to get the full quality video stream off the camera. Most analysis of images is done by humans at remote locations, and it is a challenge to get the increasing amount of content to the analysis points. As a result, low quality video streams are often sent around and much detail is lost, or a low quality sensor is used as there is no ability to deliver greater data rates off the camera.

While the camera sensors, processors, and storage have become dramatically cheaper, dramatically more reliable, and dramatically less power-hungry thanks to continuous improvement in electronics (aka "Moore's Law"), no such dynamic has been at work on the mechanical parts of surveillance cameras. The movie making industry formerly used low-volume, high-cost dedicated cameras with special lenses, mounts and storage systems until just a few years ago. However, the industry was dramatically changed by the transition to using high-volume consumer photographic and internet technology, in particular sensors (Blackmagic, Canon C-100, Sony NEX-40) and consumer standard lens mounts (EF-Mount, E-mount), as well as the use of internet standards for data storage (H.264, Firewire).

This technology is higher volume and lower cost. Today, one can buy a $300 lens and use it on a $400 Sony NEX-3n for photos and home videos, and then mount that same lens on a $40K system using the same sensor to film a major motion picture while viewing the output of that picture on any standard MacBook.

The Internet has scaled to billions of computers and millions of servers through the use of sophisticated protocols such as HTTP, HTML5, XHTML and to allow queries and processing to run across millions of nodes through technologies like Hadoop. These techniques are well understood by millions of developers and development classes are taught at the high school level in the US.

Pan/Tilt/Zoom Cameras have relatively narrow fields of view and solve the need to get high resolution by employing optical zooms of 3-10×, with a complex lens system. They solve the problem of coverage by motors that can pan the camera as much as 360 degrees around or tilt the camera up and down. These are complex mechanical systems that require maintenance and calibration.

Some camera systems will embed multiple PTZ cameras into a single housing to provide higher resolution and achieve scale economies. To provide adequate coverage, cameras are often mounted in various locations in a distributed camera network. They may also automatically scan various locations in a regular patrol path if they are PTZ cameras. When there are multiple targets, the surveillance system may direct some cameras to zoom while other cameras may continue to pan.

Because the entire area cannot be continuously scanned, these systems use algorithms such as Kalman Consensus Tracking to estimate the positions of objects that cameras cannot current see. These systems require careful calibration of the placement of cameras to ensure tracking is done properly.

Current surveillance systems use a small sensor focused on video at NTSC resolutions and increasingly HD resolution (1920×1080 or 2 megapixels at 30 frames per second typically). These systems typically have relatively narrow and fixed fields-of-view and require many cameras to cover an area while getting enough resolution to identify objects. These cameras are manually installed and calibrated by hand to ensure their placement is correct.

Some cameras use a single video sensor with a panoramic lens to replace the need for PTZ, however by spreading the resolution across 180 or 360 degrees, while pan and tilt are not necessary, resolution is poor at any particular area. Some cameras incorporate "Digital Zoom", replacing a mechanical zoom lens with digital expansion of the image. This is sometimes marketed as "Digital Pan/Tilt/Zoom" although there is no real pan or tilt feature and there is a loss of resolution.

Some cameras may have infra-red sensitive lenses and infrared radiators to see in low light or in the dark. Some cameras have dual cameras to provide stereo vision to allow distance estimation of objects. Cameras are either connected by video coax cable or they stream their video feeds over the Internet as real-time video streams (RTP) or by providing web pages from the cameras. Some cameras are wireless using WiFi or proprietary methods. Certain research systems use dual-radio systems with low bandwidth communications (e.g., Bluetooth) handled separate from high bandwidth (e.g. WiFi). Some cameras allow storage of images on SD or other cards which may be manually removed later for analysis. Surveillance systems feed into forensic and scene analysis tools; there are many systems that take a set of images from a single camera and analyze them. However they often cannot work on the full camera video resolution due to bandwidth constraints, and often cannot work in real-time. Intelligent Video Surveillance Systems are typically single cameras designed to detect specific abnormal events such as an object crossing a line and to send a message over a network. These formats are proprietary to each camera vendor and must be uniquely programmed. Some camera vendors (for example Axis) have created a developer program to allow limited placement of code directly on their cameras, permitting some limited analysis at image capture time on the sensor images using proprietary protocols and interfaces. This is an example of a smart camera, which are cameras that include a system-on-chip to provide additional scene analysis and video compression with a variety of applications as well as being able to send proprietary notification events to typically proprietary systems (e.g., Axis Surveillance system). Research has also been done on distributed smart cameras, which are fully distributed camera systems where each camera is a peer and attempts to cooperate with other cameras to in a distributed way handoff tracking of objects as they move. They do not have central controllers, but rather a peer-to-peer network where the cameras cooperate with each other using proprietary protocols (e.g., CORBA). These systems typically make heavy use of PTZ mechanisms and various path prediction algorithms to track targets in an area with very limited or spotty coverage due to the expense of the cameras involved.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION OF THE INVENTION

Glossary

Figure 1:
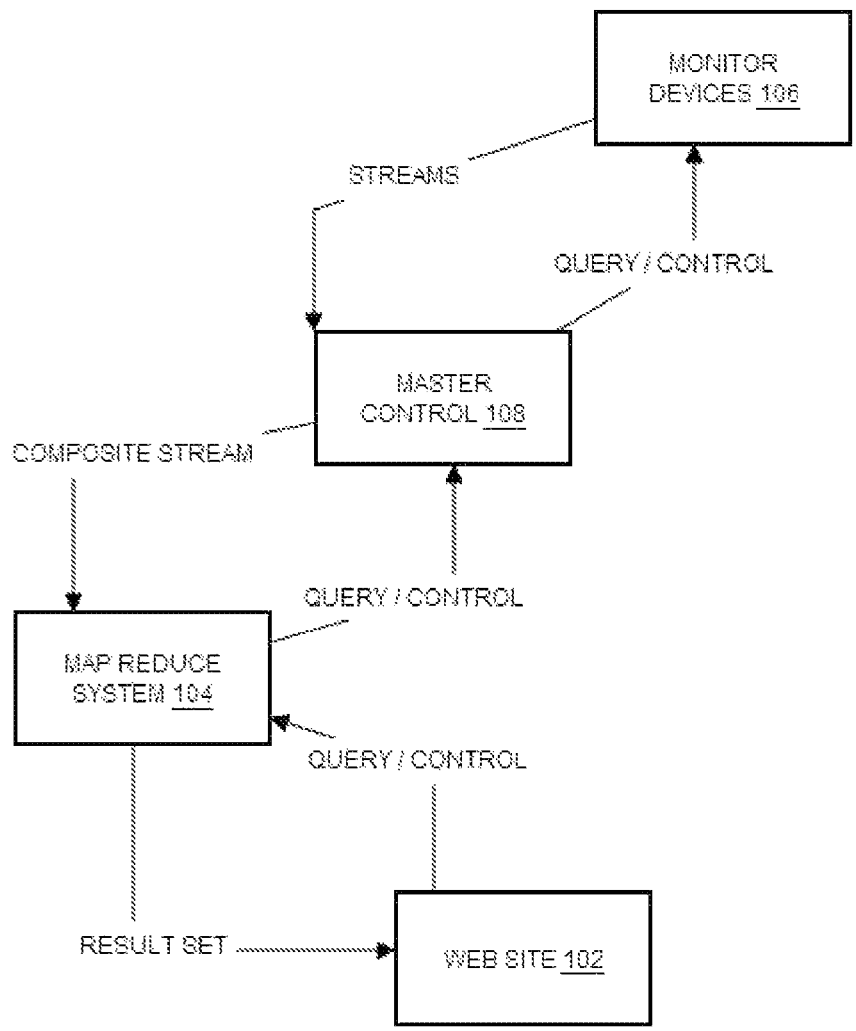
FIG. 1 is a system diagram of an embodiment of a distributed camera.

"Accelerometer" in this context refers to logic, typically a circuit, that senses tilt and motion. A device with an accelerometer senses what angle relative to a reference plane that it is oriented at. Accelerometers are also used to detect changes in velocity. An accelerometer measures linear acceleration of movement. It can also measure movements such as rotation, and motion gestures such as swinging, shaking, and flicking. One common use is to detect whether an object is upright or sideways. Another common use is controlling devices by movement, shaking, or tilt. Formally, an accelerometer is a logic component that produces a signal indicating and typically in proportion to a change in velocity and/or orientation relative to a reference plane, commonly a gravitational reference plane.

"Audio" in this context refers to a representation of sound within a device or a physical storage or communication media, typically as either analog or digital signals.

"Bandwidth" in this context refers to a measure of the signal throughput capacity of a channel or connection, or the amount of said capacity required for communication of particular signals. Bandwidth refers to a number of signals, often "bits", that can be communicated over a channel in a given amount of time with acceptable noise/distortion. Bandwidth is typically measured in hertz (Hz), cycles per second, or bits or bytes per second.

"BlueTooth" in this context refers to logic for exchanging data over short distances (using short-wavelength radio transmissions in the ISM band from 2400-2480 MHz) from fixed and mobile devices, creating personal area networks (PANs) with high levels of security. Bluetooth is a wireless protocol for exchanging data over short distances from fixed and mobile devices, creating personal area networks. There are two important parameters of Bluetooth devices—class and supported profiles. "Class" signifies the distance at which a Bluetooth connection is possible. Most mobile devices are Class 2, which means they have a range of up to 10 m. Class 1 devices are rare and have a range of up to 100 feet. A "profile" is a type of Bluetooth connection. The most common are the Headset (HSP) and Handsfree (HFP) profiles that enable the device to connect to a wireless headset or handsfree. Some other profiles are OBEX (OBject EXchange) which allows transfer of files, contacts and events; A2DP, which adds support for streaming of stereo sound and AVRC, which allows remote control of playback. Standard IEEE 802.15.1, is a wireless technology standard for exchanging data over short distances (using short-wavelength radio transmissions in the ISM band from 2400-2480 MHz) from fixed and mobile devices, creating for example personal area networks with levels of security.

"Camera" in this context refers to a device that includes a lens through which the image of an object is projected onto a surface for recording or for translation into electrical impulses or optical signals "Controller" in this context refers to a logic component that performs data or signal processing to produce output signals applied to control the operation of one or more other logic components. The controlled component(s) may be internal to or external to the machine that is or includes the controller. A controller may form a link between two parts of a data processing device (for example a memory controller that manages access to memory for a computer) or a controller on an external device that manages the operation of (and connection with) that device.

"CORBA" in this context refers to Common Object Request Broker Architecture (CORBA), a standard defined by the Object Management Group (OMG) designed to facilitate the communication of systems that are deployed on diverse platforms. CORBA enables collaboration between systems on different operating systems, programming languages, and computing hardware. CORBA has many of the same design goals as object-oriented programming: encapsulation and reuse.

"DHCP" in this context refers to (Dynamic Host Configuration Protocol) is a standardized networking protocol used on Internet Protocol (IP) networks for dynamically distributing network configuration parameters, such as IP addresses for interfaces and services. With DHCP computers request IP addresses and networking parameters automatically from a DHCP server, reducing the need for a network administrator or a user from having to configure these settings manually.

"EXIF" in this context refers to Exchangeable image file format, is a format for images, sound, and ancillary tags used by digital cameras (including smartphones), scanners and other systems handling image and sound files recorded by digital cameras.

"File" in this context refers to an organization of machine memory including physical partitioning bounding the file contents and distinguishing the file contents from the contents of other areas of the memory, including other files. The file typically configures the machine memory so that an operating system or BIOS can access the file contents using an identifier, which is often a human-readable sequence of symbols (the file name).

"Flash Memory" in this context refers to a type of electrically erasable programmable read-only memory (EEPROM), in which a section of memory cells can be erased in a single action or in a "flash." A common use of flash memory is to store device settings that persist across power interruptions. Flash memory is used in digital cameras, cellular phones, networking hardware, and PC cards. Flash memory is non-volatile computer memory that can be electrically erased and reprogrammed. Non-volatile means that no power is needed to maintain the information stored on the chip. It is a technology that is primarily used in memory cards and USB flash drives as solid state storage and its main purpose is an inexpensive way of storing or transferring data between computers and other digital products. It's used as primary storage memory on various portable devices due to its low cost, compact size, great physical endurance and low power consumption. The most popular types of flash memory are NAND and NOR. A type of memory chip that is used for storing information over time. Compared to other types of memory, flash memory retains information without electrical power, which is why flash memory is used for removable memory cards, as well as internal memory for data that should be retained when the device is turned off. Popular types of removable flash memory cards include SD and microSD.

"GPU" in this context refers to (Graphics Processing Unit) a specialized circuit designed to accelerate the image output in a frame buffer intended for output to a display. GPUs are efficient at manipulating graphics data and are generally more effective than general-purpose CPUs for algorithms where processing of large blocks of data is done in parallel. Graphics Processing Unit. The part of a device's circuitry that handles the display and animation of visual elements. It may be integrated into the main processor (CPU) or it may be a separate chip. A better and/or faster GPU allows a phone to display video and complex game animation more smoothly.

"Hadoop" in this context refers to an open-source software framework for storage and large-scale processing of data-sets on clusters of commodity hardware.

"HD" in this context refers to (High Definition) A broad term applied to any number of digital media formats and/or technologies that provide improved detail and resolution. It is used primarily with regard to video images, but is also sometimes used to refer to still images, and sometimes audio. Audio/visual content can be HD. That content must be captured with HD-capable technology, and requires HD-capable technology to view in full detail. Most commonly, HD refers to 720p and 1080p (or 1080i) video content. It is also used to refer to phone displays with pixel dimensions that match 720p and 1080p video content. In audio, HD Voice provides greater audio clarity than standard phone voice quality. Some phones have "HD" microphones that are actually combination of two microphones: one for low volumes, and one for loud sound (also called high-pressure audio.) This allows them to capture sound of all volumes with good quality.

"HTML" in this context refers to HyperText Markup Language, a standard markup language used to define web pages on the Internet for viewing and interaction with web browsers.

"HTTP" in this context refers to Hypertext Transfer Protocol (HTTP), an application protocol for distributed, collaborative, hypermedia information systems. HTTP is the foundation of data communication for the World Wide Web. Hypertext is structured text that uses logical links (hyperlinks) between nodes containing text. HTTP is the protocol to exchange or transfer hypertext.

"HTTPS" in this context refers to a core technology markup language of the Internet used for structuring and presenting content for the World Wide Web. It is the fifth revision of the HTML standard (created in 1990 and standardized as HTML 4 as of 1997) and, as of December 2012, is a candidate recommendation of the World Wide Web Consortium (W3C). Its core aims have been to improve the language with support for the latest multimedia while keeping it easily readable by humans and consistently understood by computers and devices (web browsers, parsers, etc.)

"Image" in this context refers to information captured and stored by a device representing a visual perception, usually a two-dimensional picture. Images may be captured, stored, and communicated by devices in either analog or digital formats.

"Internet" in this context refers to a global system of interconnected computer networks that use the standard Internet protocol suite (TCP/IP) to serve several billion users worldwide. It is a network of networks that consists of millions of private, public, academic, business, and government networks, of local to global scope, that are linked by a broad array of electronic, wireless and optical networking technologies. The Internet carries an extensive range of information resources and services, such as the inter-linked hypertext documents of the World Wide Web (WWW), the infrastructure to support email, and peer-to-peer networks.

"IP" in this context refers to (Internet Protocol) a primary protocol in the Internet protocol suite designed to enable delivery of data packets from a source device to a destination device based on an address (i.e., an IP address). IP defines datagram structures that encapsulate the data to be delivered. It also defines addressing mechanisms to identify the datagram source and destination devices. IP is the protocol used for communicating data across a packet-switched network used in most publicly accessible networks today. Connections that mobile devices make to GPRS, 3G and similar networks are made using IP.

"JPEG" in this context refers to Joint Pictures Expert Group.

"LED" in this context refers to Light-Emitting Diode. A small semiconductor device that emits light when charged with electricity. LEDs come in many colors, and some LEDs contain multiple elements and are therefore capable of multiple colors.

"Microphone" in this context refers to an acoustic-to-electric transducer or sensor that converts sound into an electrical signal. Many microphones use electromagnetic induction (dynamic microphone), capacitance change (condenser microphone), piezoelectric generation, or light modulation to produce an electrical voltage signal from mechanical vibration.

"Network" in this context refers to a telecommunications network that allows computers to exchange data. In computer networks, networked computing devices pass data to each other along data connections. The connections (network links) between nodes are established using either cable media or wireless media.

"NTSC" in this context refers to National Television System Committee, the analog television system that is/was used in most of the Americas (except Brazil, Argentina, Paraguay, Uruguay), French Guiana, Myanmar, South Korea, Taiwan, Japan, the Philippines, and some Pacific island nations and territories.

"Peer-to-peer" in this context refers to a device network in which each device acting as a node in the network may act as a client or server for the other nodes in the network, allowing shared access to various resources such as files, peripherals, and sensors without necessarily utilizing a central server device.

"Pixel" in this context refers to the smallest visual unit in an electronic display or visual data file; a single "dot". Most modern electronic displays are composed of a grid of pixels. Each pixel can be turned on or off, or—in the case of full-color displays—dimmed or made a specific color. In this way, pixels are individually controlled to cause the whole display to show information and graphics. An important measure of an electronic display the number of pixels. More pixels allow the display to show more detail and more information. This is called "resolution" and is typically stated in terms of vertical and horizontal pixels (such as 240×320). Pixels can also be used to describe the smallest visual unit in a visual data file, such as a captured photograph or video clip. Pixel comes from "pix" (for "picture") and el (for "element"). A pixel is the smallest piece of information on an image. This is a unit for measuring image resolution, and the more pixels a picture consists of, the more detailed it is.

"Processor" in this context refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine.

"RAID" in this context refers to redundant array of independent disks), a data storage virtualization technology that combines multiple disk drive components into a logical unit for the purposes of data redundancy and performance improvement. Data is distributed across the drives in one of several ways, referred to as RAID levels, depending on the specific level of redundancy and performance required. The different schemes or architectures are named by the word RAID followed by a number (e.g. RAID 0, RAID 1). Each scheme provides a different balance between the key goals: reliability and availability, performance and capacity. RAID levels greater than RAID 0 provide protection against unrecoverable (sector) read errors, as well as whole disk failure.

"RTP" in this context refers to Real-time Transport Protocol a packet format for delivering audio and video over IP networks. RTP is used in communication and entertainment systems that involve streaming media, such as telephony, video teleconference applications, television services and web-based push-to-talk features. RTP is used in conjunction with the RTP Control Protocol (RTCP). While RTP carries the media streams (e.g., audio and video), RTCP is used to monitor transmission statistics and quality of service (QoS) and aids synchronization of multiple streams.

"SD" in this context refers to Secure Digital. A type of removable flash memory card. Like any flash memory card, it can be used to store various types of files, including photos, videos, music, or software. SD is smaller than Compact Flash, but larger than miniSD, TransFlash, or RS-MMC. SD is the same size as MMC, but thicker. Most devices with SD slots can also accept MMC cards, but not vice-versa. SD cards are generally faster than MMC, but use more power. There is an extension of the SD protocol known as SDIO that allows devices other than memory cards to be used in SD slots, such as cameras or wi-fi adapters.

"Sensor" in this context refers to a device or composition of matter that responds to a physical stimulus (as heat, light, sound, pressure, magnetism, or a particular motion) and transmits a resulting impulse (as for measurement or operating a control).

"Speaker" in this context refers to a device that converts signals output from a device into vibrations in a physical medium, usually the air.

"Video" in this context refers to information captured and stored by a device representing a sequence of moving pictures. Video may be captured, stored, and communicated by devices in either analog or digital formats. (1) Refers to recording, manipulating, and displaying moving images, especially in a format that can be presented on a television. (2) Refers to displaying images and text on a computer monitor or mobile device. The video adapter, for example, is responsible for sending signals to the display device. (n.) A recording produced with a video recorder (camcorder) or some other device that captures full motion.

"Web page" in this context refers to a file configured for access and display via a web browser over the Internet, or Internet-compatible networks. Also, logic defining an information container that is suitable for access and display using Internet standard protocols. Content defined in a web page is typically accessed using a web browser, and displayed. Web pages may provide navigation to other web pages or content via hypertext links. Web pages frequently subsume other resources such as style sheets, scripts and images into their final presentation. Web pages may be retrieved for display from a local storage device, or from a remote web server via a network connection.

"WiFi" in this context refers to (also spelled Wi-Fi) logic that allows an electronic device to exchange data with another device or connect to a machine network such as the Internet wirelessly using radio waves. The term may refer to any logic that the Institute of Electrical and Electronics Engineers' (IEEE) 802.11 standards". The term "Wi-Fi" may thus be used as a synonym for "WLAN". A device comprising Wi-Fi (such as a personal computer, video-game console, smartphone, digital camera, tablet or digital audio player) can connect to a network resource such as the Internet via a wireless network access point. WiFi can refer to wireless local area network (WLAN) communication logic and techniques that are based on the Institute of Electrical and Electronics Engineers' (IEEE) 802.11 standards. Wi-Fi is a WLAN (Wireless Local Area Network) technology.

"xHTML" in this context refers to eXtensible HyperText Markup Language, a newer version of the HTML markup language (code) used to create Internet web pages. Unlike the older HTML, xHTML includes several core features designed specifically with mobile devices in mind. Special versions of xHTML—such as xHTML Basic and xHTML Mobile Profile—are designed specifically for mobile devices. xHTML also includes features that allow a website designed for a full PC to automatically display in a simplified version on a mobile device. xHTML also adheres to strict XML rules, which makes it much easier for devices with limited processing power (like phones) to understand and display quickly and consistently. xHTML is a core part of the WAP 2.0 standard, replacing the WML language that was used in WAP 1.x. While most new phones support xHTML, many older phones only support WML and/or HDML.

Description

References to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other.

"Logic" refers to machine memory circuits, machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic.

Those skilled in the art will appreciate that logic may be distributed throughout one or more devices, and/or may be comprised of combinations memory, media, processing circuits and controllers, other circuits, and so on. Therefore, in the interest of clarity and correctness logic may not always be distinctly illustrated in drawings of devices and systems, although it is inherently present therein.

The techniques and procedures described herein may be implemented via logic distributed in one or more computing devices. The particular distribution and choice of logic may vary according to implementation.

The following description is made in connection with exemplary embodiments of a camera system and should not be construed as limiting in a general sense. The scope of the invention is set forth and defined by the claims of this application.

A camera system embodiment is described comprising an array of camera modules (1" or larger in diagonal) with 10-20 times the pixels of a traditional surveillance camera sensor. Each element is redundant and can be tuned for different capabilities such as zoom, focus, sensitivity to different spectrum such as IR and light sensitivity (ISO). A processor, storage and communication elements are included that allows the camera to store and analyze information and produce a composite XHTML stream that includes a minimum of raw video and photos augmented with object information on vectors and orientation. The system self-installs and orients itself and connects to other similar systems.

The system is enabled by a device or devices, each of which has an array of sensors, including but not limited to cameras, microphones, motion sensors, accelerometers, and proximity sensors. The devices may also incorporate a variety of outputs, including but not limited to video, audio, speakers, and LED lights. The devices will have network connectivity of some sort, and may be AC or battery powered. The devices may be standalone devices or integrated into other electric and electronic devices, and may be stationary, movable, or even mobile (drones). The devices can be used alone or in groups. For full details on the devices, see Appendix A of U.S. patent application No. 61/830,893, which is incorporated by reference herein in its entirety, "Example Camera Module". For an embodiment of technology to coordinate the system in a network environment, refer to U.S. patent application No. 62/007,006, filed on Jun. 3, 2014, which is also incorporated by reference herein in its entirety.

Each device further comprises an array of camera sensors, each with an associated computer processor with graphics processor and large scale storage capabilities. The arrays of sensors can be 2×2, 4×4, 8×8 or any configuration. These sensors are derived from consumer cameras designs (such as the Sony RX100, Olympus OM-MDS). The particular array shape may depend on the application. A square of 2×2, 3×3, 4×4, and so on may be appropriate for traditional rooms or open environments. However, other useful arrays may be long and parallel (e.g., 2×1, 3×1) for use in hallways or other areas that are not square. The system may also be rectangular for rectangular shaped rooms such as conference rooms (e.g., 2×3, 3×5).

Each camera sensor has an associated lens mount which allows different lenses to be installed. All sensors in the array may have identical lenses, or they may have different lenses with different physical characteristics. For instance, one sensor may have its IR filter removed and be tuned for infrared heat detection. Typically, one element will have a wide angle lens to capture information on the peripheries, whereas some of the central elements will have higher magnification lenses. Other lenses may be wide aperture with good low light performance. In some implementations there may be no mechanics in the lenses at all. They are fixed focus lenses of different distances to completely eliminate any mechanical cost.

Each sensor can capture a HD video feed at 30-60 fps, and also can take 16MP or higher full resolution images at 15 fps or higher and also integrates a stereo microphone feed.

The sensors may be coplanar or may be on different surfaces. Coplanar designs may be optimal for orienting sensors all towards one area. Sensors on different surfaces may be optimal for a broader coverage area. The sensors and processors are connected within the overall camera by a high speed bus and may have access to shared storage. Each sensor/processor pairing exposes an IP and HTTP interface.

Each device may also include a system controller that manages the various cameras similar to the way a RAID controller for disks manages the individual disks. The system controller may be a physically separate processor or the system may allow election of a master processor from amongst the device peers (such as done with browse master elections in SMB networks or Apple Bonjour systems with micro-DHCP). The system controller exposes an IP and HTTP interface. The system controller presents all the camera elements as one logical camera to external requests.

On startup, the controller interrogates each element to determine its capabilities through an XHTML transfer that provides the resolution, the lens system information (aperture, focal length, etc.) using traditional EXIF format information. Each element also relays its processing and storage capability in a property list (such as Apple provides in its system information file format).

The device uses this array of sensors and processors to implement a number of novel capabilities. The novel capabilities arise from the combination of the image streams from the various sensors in a number of different ways.

The output of the sensor arrays can be merged to provide a higher resolution image using super resolution techniques. Super resolution is a technique to overlay images to allow detection of sub-resolution-pixel imagery, thus providing a finer resolution image than would be available from just one sensor. The output from each sensor is upsampled; the sensor results are overlaid and accumulated and normalized. The resultant normalized image has resolution close to that of the upsampled output.

The output of the sensor arrays can be merged to reduce overall noise levels in the image. Statistical averaging of multiple sensor outputs with independent noise functions can result in an image with lower noise levels than available from just one sensor.

The output of the sensor array may have different sensors at the same time or with a single sensor in sequence may take underexposed and overexposed images and fuse these images together increasing the dynamic range it sees—a technique called Exposure Bracketing, leading to a High Dynamic Range image.

The output of the sensor arrays can be stitched together to create a larger image than would be available from just one sensor. Even if the sensors are not coplanar, larger images can still be formed through trigonometric projection of all the images onto a single surface.

The device emulates a PTZ camera digitally by implementing pan and tilt and coalescing all the views of the various camera elements into a single integrated imaging system. Initially, the controller provides an HD stream by merging the centermost portions of the sensors. Pan and tilt can then be implemented by returning more of the image from the sensor in the selected direction. Zoom is implemented by returning greater density of pixels in the desired area.

The system also can determine distance to any object by using a contrast or phase detection scheme built into the cameras and operating the focus mechanism. If only fixed focus lenses are used in the system, the camera element with the sharpest image may be utilized for an approximate distance. As a second feature, with this kind of array, the system combines images to do 3-D detection by noting the offsets of images and computing the physical distances of objects that it sees using standard 3-D imaging techniques.

The system can detect and correct faults at a variety of levels. CPU/GPU faults for a single sensor can be detected via non-responsiveness of the HTTP interface for that sensor, and the controller can disable that sensor. Sensor failure can be detected if a sensor appears completely out of bounds (for instance if it is all black) or doesn't corroborate with the other sensors, and that sensor can be disabled. If a camera shows an image which doesn't appear in the overlapping views, then the controller marks that camera element as faulty. Pixel failures can be detected similarly and faulty pixels can be tagged and ignored. Lens obstructions, scratches, or smears can be detected via non-corroboration and ignored. In some instantiations, the individual sensor and processor elements are hot-swappable, allowing field replacement of faulty elements.

The device captures a description of the entire visible scene when first installed, including a geometry of the monitored space. This scene description and geometry is updated over time and can also be modified and improved by the user.

A tracking subsystem uses sensor input, including cameras and microphones, to detect people and objects in the monitored space, motion within the area or across its boundaries, changes in motion, changes in contents, sound changes, voice commands, and other sensory input. The subsystem can be trained to focus on subareas or particular event types, or to ignore certain areas or event types.

The system uses the tracking and geometry capabilities to generate not only video and image feeds, but to generate feeds of scene descriptions and events. The system can present full video feeds at its external HTTP interface, or lower bandwidth feeds of scene descriptions and events.

The system can simultaneously capture a video feed on some sensors to track movement while capturing higher definition images on other sensors for use in more detailed face and object recognition tasks, or document scanning, or performing distance measurements.

The system can use any CPU/GPU for advanced image recognition tasks. CPU/GPUs can be used in an image recognition chain. The system controller can look for available GPUs and other computing elements and assign them recognition tasks and continue to pass the hybrid data stream adding more and more recognition as time allows.

The system may utilize standard components from the consumer photography market. For example it may use high volume commercially available camera chips (such as found in the Sony NEX-7, Sony RX-100 or the Olympus), standard lens mounts (such as the Sony E-Mount or Micro-4/3) and thus a variety of lenses of high quality. Such systems typically have 10× resolution than typical surveillance cameras, have good low light performance (ISO 6400+) and close to theoretical maximum dynamic range. There are a wider variety of lenses available as well because it is using standard sensor sizes (such as APS-C or Micro-4/3)

The system does not incur the complexities and cost of mechanically steered systems. In a typical camera with even a high definition feed provides a 2MP (1920×1080=2MP) and requires at least three motors to implement PTZ plus focus. This system utilizes sensors so that an effective 2×2 array might have 20 megapixels×4=80 megapixels of resolution or more than 40 times a high definition video feed (1920×1080=2MP). The system is panoramic but has enough resolution that it can zoom up to 20× and still provide the same resolution as a traditional HD camera.

The system can see an entire area simultaneously and is less likely to lose a subject. And, because it has high resolution, it can track all subjects simultaneously whereas a traditional PTZ distributed camera network can only track as many subjects as it has cameras. The system does not rely on focusing cameras on points of interest and trying to guess what those points are.

The system may benefit from the high volume consumer electronics market so it has a long term cost advantage given the high volumes in high resolution sensors and lens systems for that market.

Use of large sensors improves the sensitivity of individual photon receptors. The current sensor technology can handle low light ISO in the range of 6400 with a single sensor and with multiple sensors and noise filtering as a result that figure can be improved to ISO32400 or near zero light conditions.

The system is flexible because the system can be reconfigured dynamically and quickly. The array can take a 3-D image to determine distance and in the next frame take a high dynamic range (HDR) photo to look for high contrast and in the next set of frames supply a high definition video image.

The system can integrate gestures and voice recognition because it includes audio monitoring and can combine audio detection with facial detection and use directional processing to determine which subject spoke.

The system does not require careful positioning or calibration. It includes onboard components not present in traditional surveillance systems so that it can quickly understand its location and orientation automatically.

The system is flexible because it can use different lenses in the same system. Even higher resolution can be achieved with lenses of high zoom. Infrared can be easily added to the system and does not require another camera mount, just a change of lens.

The system is fault tolerant because its sensors are overlapping. A single fault will not take the system down and each module is easily replaceable or disposable then systems that rely on a single sensor or which have moving parts that can fail.

Rather than just providing a simple stream, the system looks like a web service and you can use conventional HTTP and web programming techniques to operate the system. It does not require a separate command channel or knowledge of streaming only protocols like RTP. Instead it uses (for example) HTML5 which is widely used by web based streaming services like Youtube, Vimeo and other content providers. Refer to application No. 62/007,006 (incorporated by reference herein).

The system sends out vector and location information rather than the raw video feed. It does keep a buffer of video feed but this only needs to be accessed when close monitoring is needed. It does image processing in the system itself.

The system is sensitive in low light and other difficult scenarios because it uses multiple sensors. Because the cameras overlap and can take different exposures. And because they use different lenses, the system has higher resolution (20MP) in the center while have very wide coverage in the outer areas because it uses a combination of lenses from wide angle to telephoto in the center much as a human eye works with detailed coverage in the center and motion sensing at the peripherals.

The system integrates processing and storage and provides a single virtual view with many camera elements integrated. It does not require the upstream systems to do the image understanding, and like progressive rendering in JPEG and other elements, image recognition can be added gradually and easily into the video stream providing very large scale compression and easier searching.

Massive and distributed queries are enabled Hadoop-style so that broad image searches can be done in a distributed fashion.

The system external interface uses Internet standards for all communications. This minimizes the programming difficulties and integration difficulties of proprietary surveillance systems. The model used is of web services rather than client-server or customized peer-to-peer systems that required specialized understanding of object models. The Internet model of web servers and services allows the system to scale and be easy to develop applications.

The system internally is structured as a set of cooperating web services running on different processors. This allows these same Internet techniques to be used within the array. This means that the array can itself scale to arbitrarily large and not require reprogramming. It also means it inherits the robustness attributes fundamental to an internet oriented system.

The techniques and procedures described herein may be implemented via logic distributed in one or more computing devices. The particular distribution and choice of logic is a design decision that will vary according to implementation. Those having skill in the art will appreciate that there are various logic implementations by which processes and/or systems described herein can be effected (e.g., hardware, software, and/or firmware), and that the preferred vehicle will vary with the context in which the processes are deployed. "Software" refers to logic that may be readily readapted to different purposes (e.g. read/write volatile or nonvolatile memory or media). "Firmware" refers to logic embodied as read-only memories and/or media. Hardware refers to logic embodied as analog and/or digital circuits. If an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations may involve optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. Several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory.

In a general sense, those skilled in the art will recognize that the various aspects described herein which can be implemented, individually and/or collectively, by a wide range of hardware, software, firmware, or any combination thereof can be viewed as being composed of various types of" circuitry." Consequently, as used herein "circuitry" includes, but is not limited to, electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), circuitry forming a memory device (e.g., forms of random access memory), and/or circuitry forming a communications device (e.g., a modem, communications switch, or optical-electrical equipment).

Those skilled in the art will recognize that it is common within the art to describe devices and/or processes in the fashion set forth herein, and thereafter use standard engineering practices to integrate such described devices and/or processes into larger systems. That is, at least a portion of the devices and/or processes described herein can be integrated into a network processing system via a reasonable amount of experimentation.

The foregoing described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

Drawings

Figure 2:
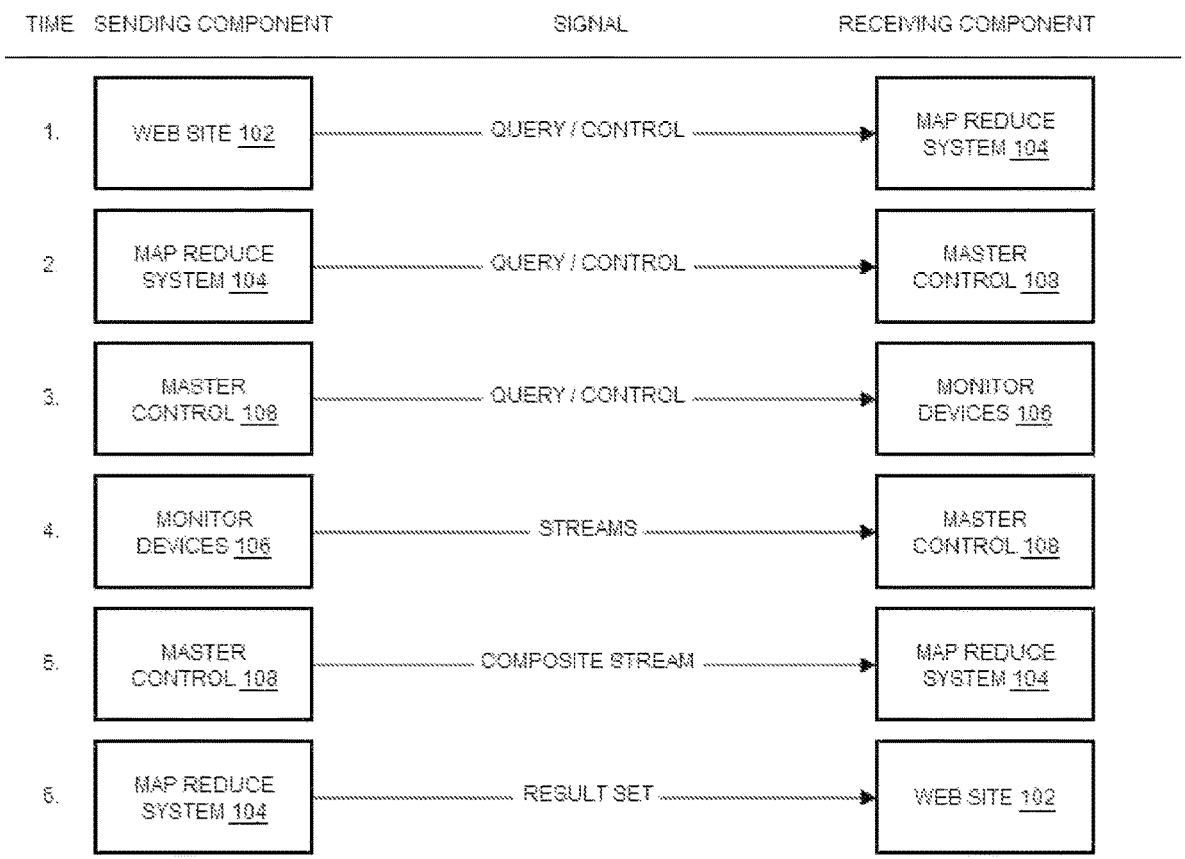
FIG. 2 is an action flow diagram of an embodiment of a distributed camera process.
Figure 3:
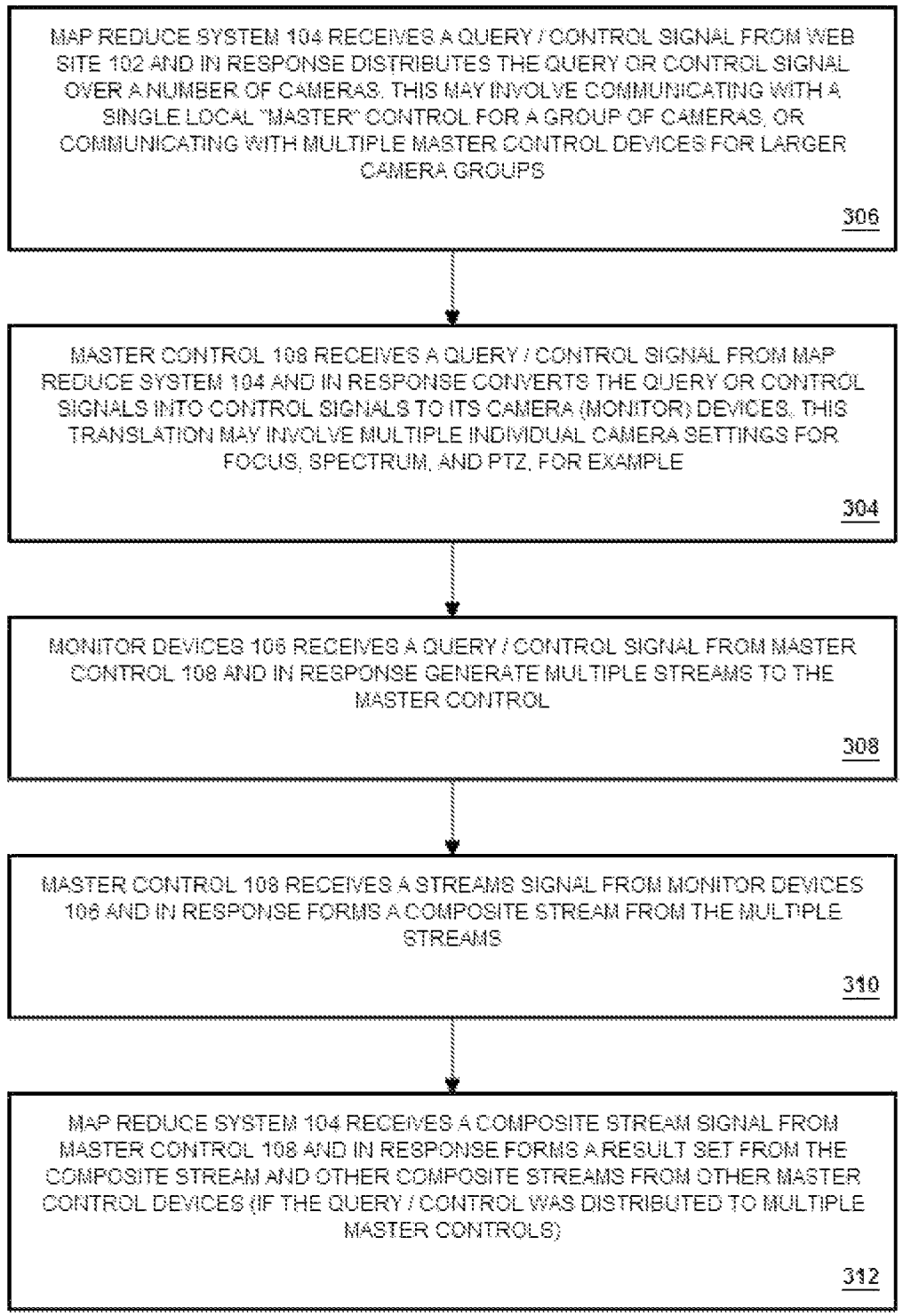
FIG. 3 is a flow chart of an embodiment of a distributed camera process.
Figure 4:
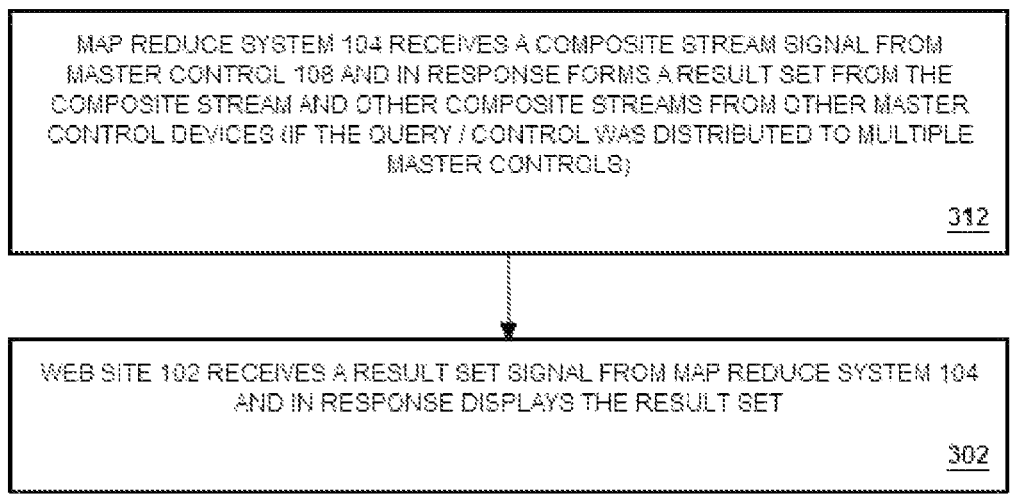
FIG. 4 is a flow chart of an embodiment of a distributed camera process.

FIG. 1 is a system diagram of an embodiment of a distributed camera. FIG. 2 is an action flow diagram of an embodiment of a distributed camera process. FIG. 3-4 is a flow chart of an embodiment of a distributed camera process. The system comprises web site 102, map reduce system 104, monitor devices 106, and master control 108. The map reduce system 104 receives a query/control signal from web site 102 and in response distributes the query or control signal over a number of cameras. This may involve communicating with a single local "master" control for a group of cameras, or communicating with multiple master control devices for larger camera groups (306). The master control 108 receives a query/control signal from map reduce system 104 and in response converts the query or control signals into control signals to its camera (monitor) devices. This translation may involve multiple individual camera settings for focus, spectrum, and PTZ, for example (304). The monitor devices 106 receive a query/control signal from master control 108 and in response generate multiple streams to the master control (308). The master control 108 receives a streams signal from monitor devices 106 and in response forms a composite stream from the multiple streams (310). The map reduce system 104 receives a composite stream signal from master control 108 and in response forms a result set from the composite stream and other composite streams from other master control devices (if the query/control was distributed to multiple master controls) (312). The web site 102 receives a result set signal from map reduce system 104 and in response (302) displays the result set (302).

Figure 5:
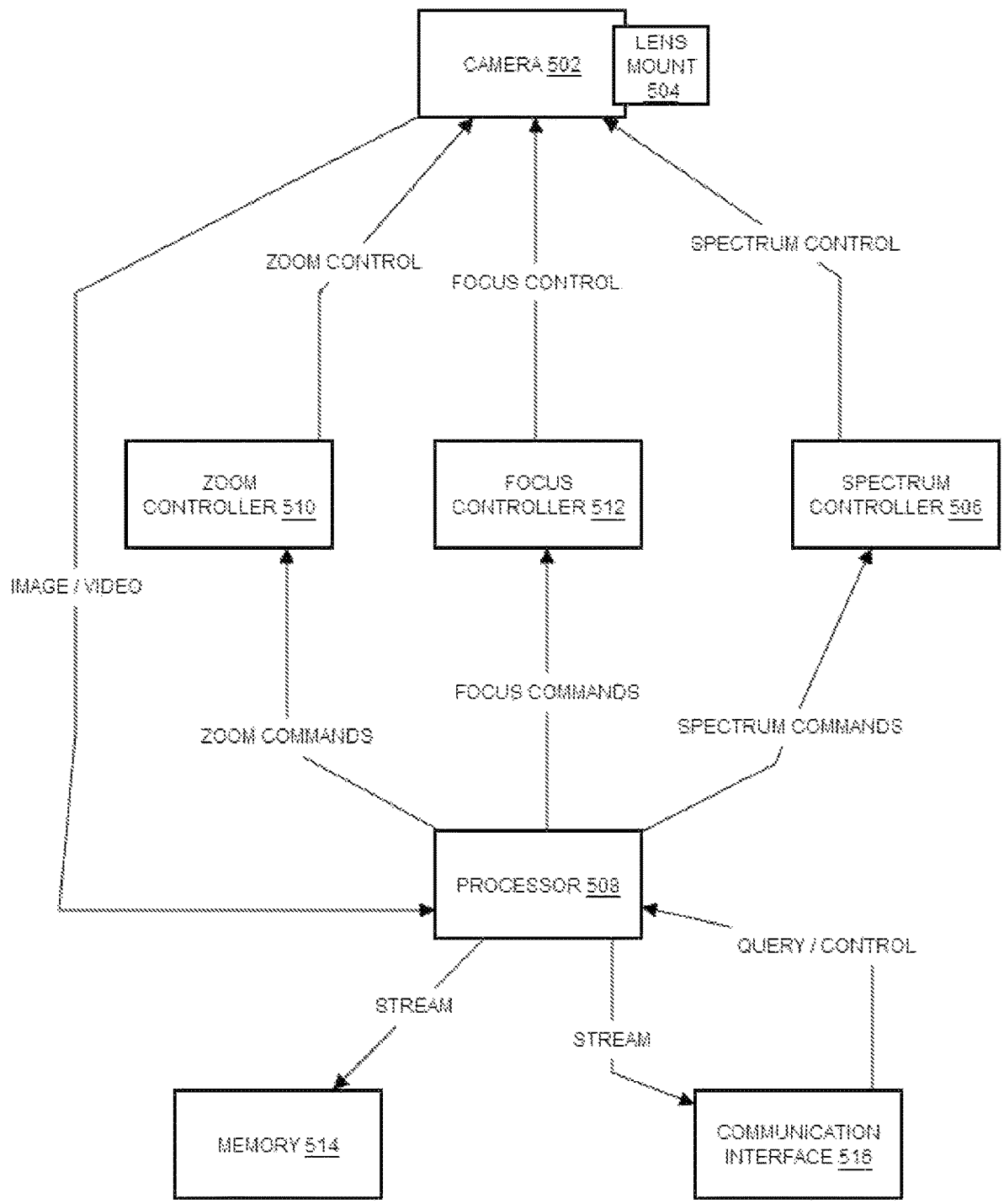
FIG. 5 is a system diagram of an embodiment of a camera system.
Figure 6:
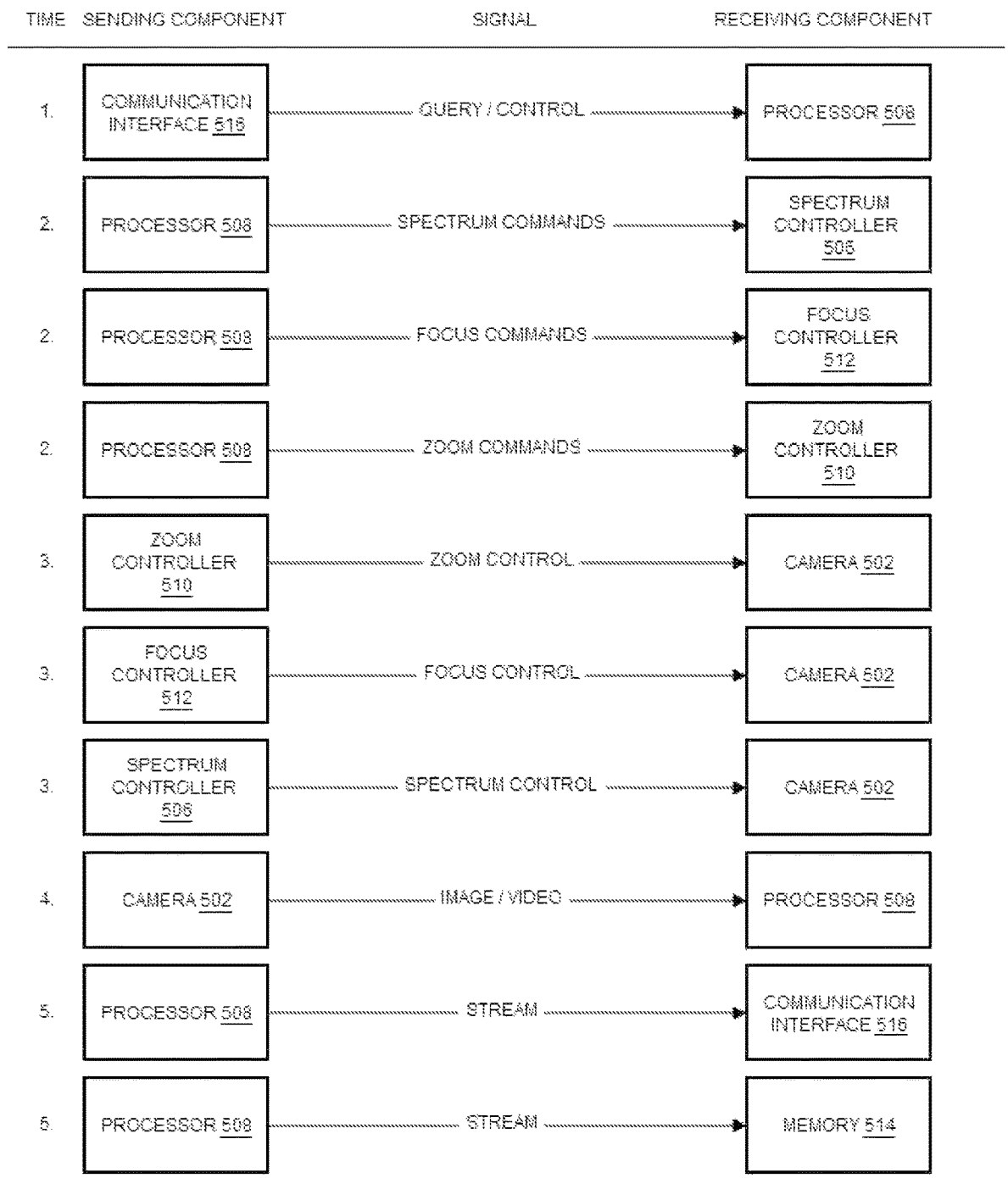
FIG. 6 is an action flow diagram of an embodiment of a camera system process.
Figure 7:
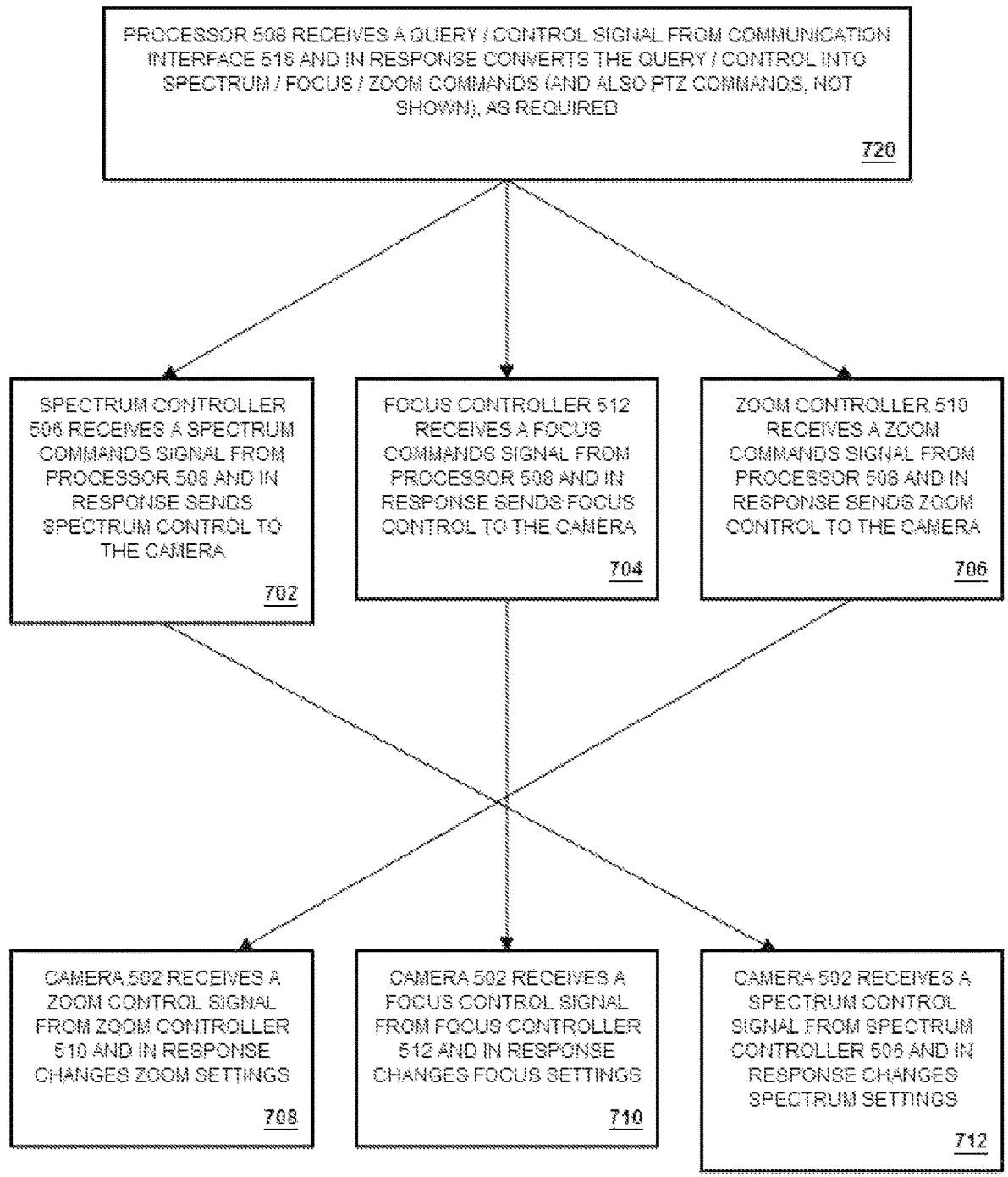
FIG. 7 is a flow chart of an embodiment of a camera system process.
Figure 8:
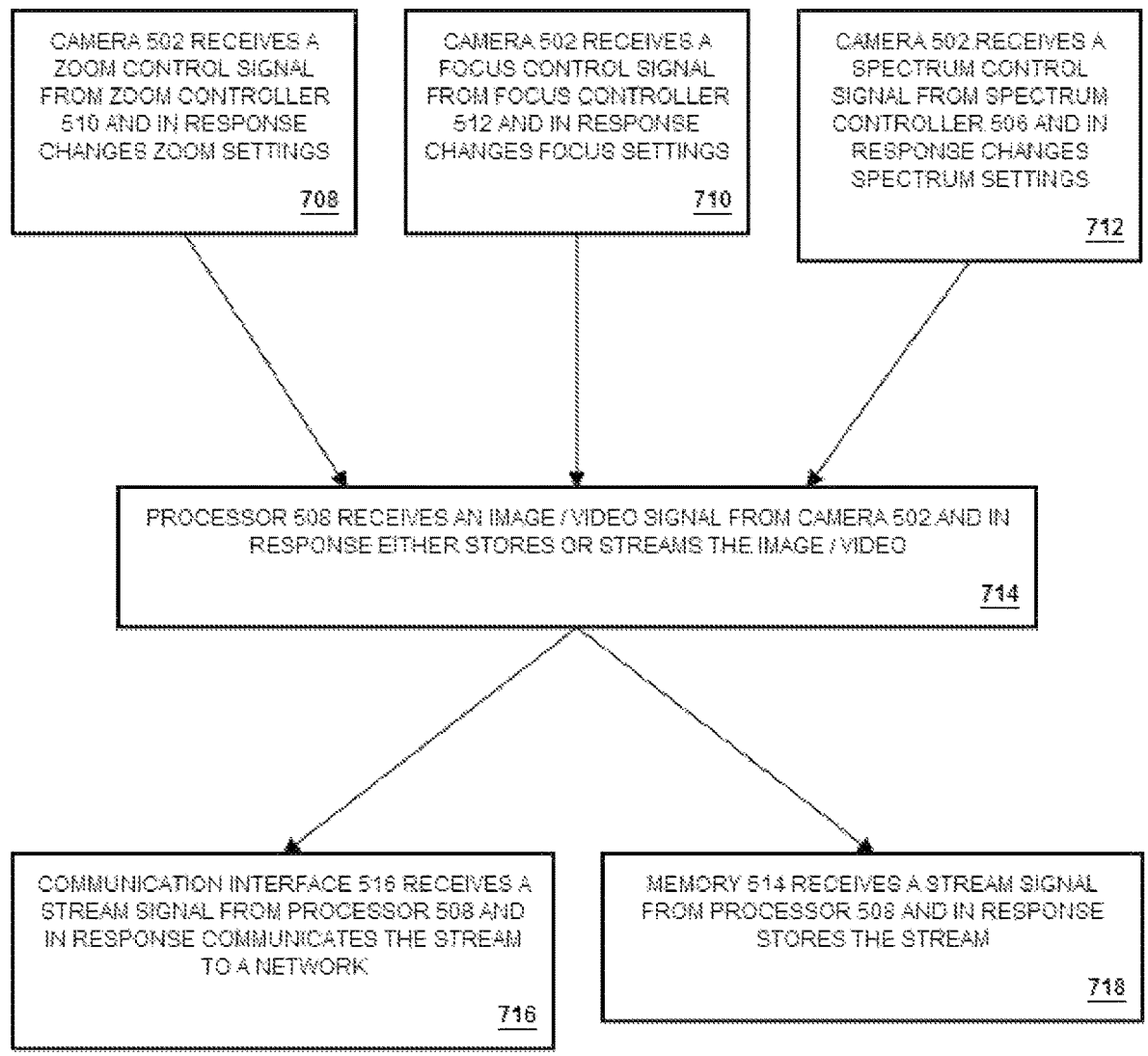
FIG. 8 is a flow chart of an embodiment of a camera system process.

FIG. 5 is a system diagram of an embodiment of a camera system. FIG. 6 is an action flow diagram of an embodiment of a camera system process. FIG. 7-8 is a flow chart of an embodiment of a camera system process. The system comprises camera 502, lens mount 504, spectrum controller 506, processor 508, zoom controller 510, focus controller 512, memory 514, and communication interface 516. Processor 508 receives a query/control signal from communication interface 516 and in response converts the query/control into spectrum/focus/zoom commands (and also PTZ commands, not shown), as required (720). Spectrum controller 506 receives a spectrum commands signal from processor 508 and in response sends spectrum control to the camera (702). Focus controller 512 receives a focus commands signal from processor 508 and in response sends focus control to the camera (704). Zoom controller 510 receives a zoom commands signal from processor 508 and in response sends zoom control to the camera (706). Camera 502 receives a zoom control signal from zoom controller 510 and in response changes zoom settings (708). Camera 502 receives a focus control signal from focus controller 512 and in response changes focus settings (710). Camera 502 receives a spectrum control signal from spectrum controller 506 and in response changes spectrum settings (712). The processor 508 receives an image/video signal from camera 502 and in response either stores or streams the image/video (714). The communication interface 516 receives a stream signal from processor 508 and in response communicates the stream to a (716). The memory 514 receives a stream signal from processor 508 and in response stores the stream (708).

Figure 9:
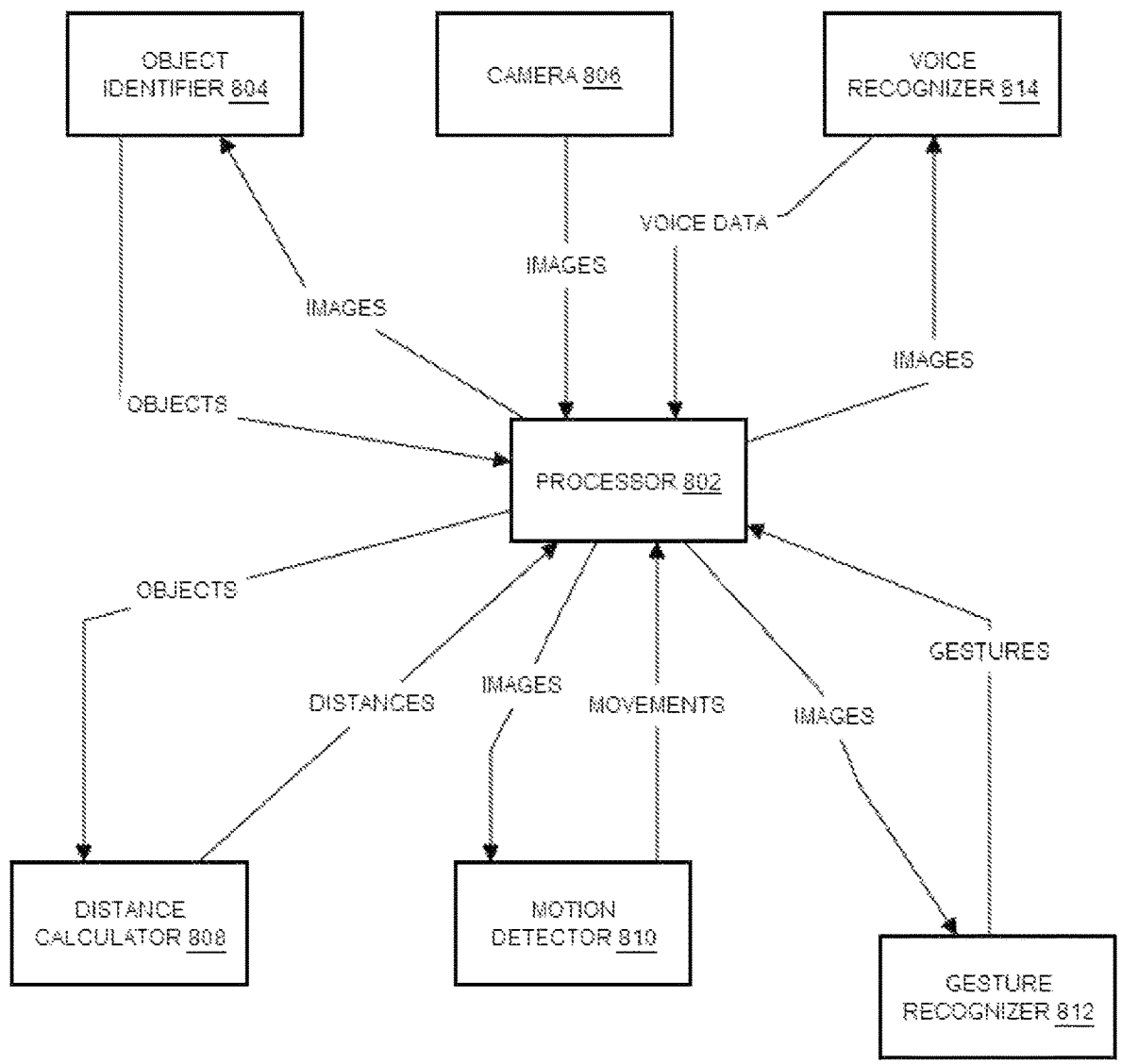
FIG. 9 is a system diagram of an embodiment of a stream forming device.
Figure 10:
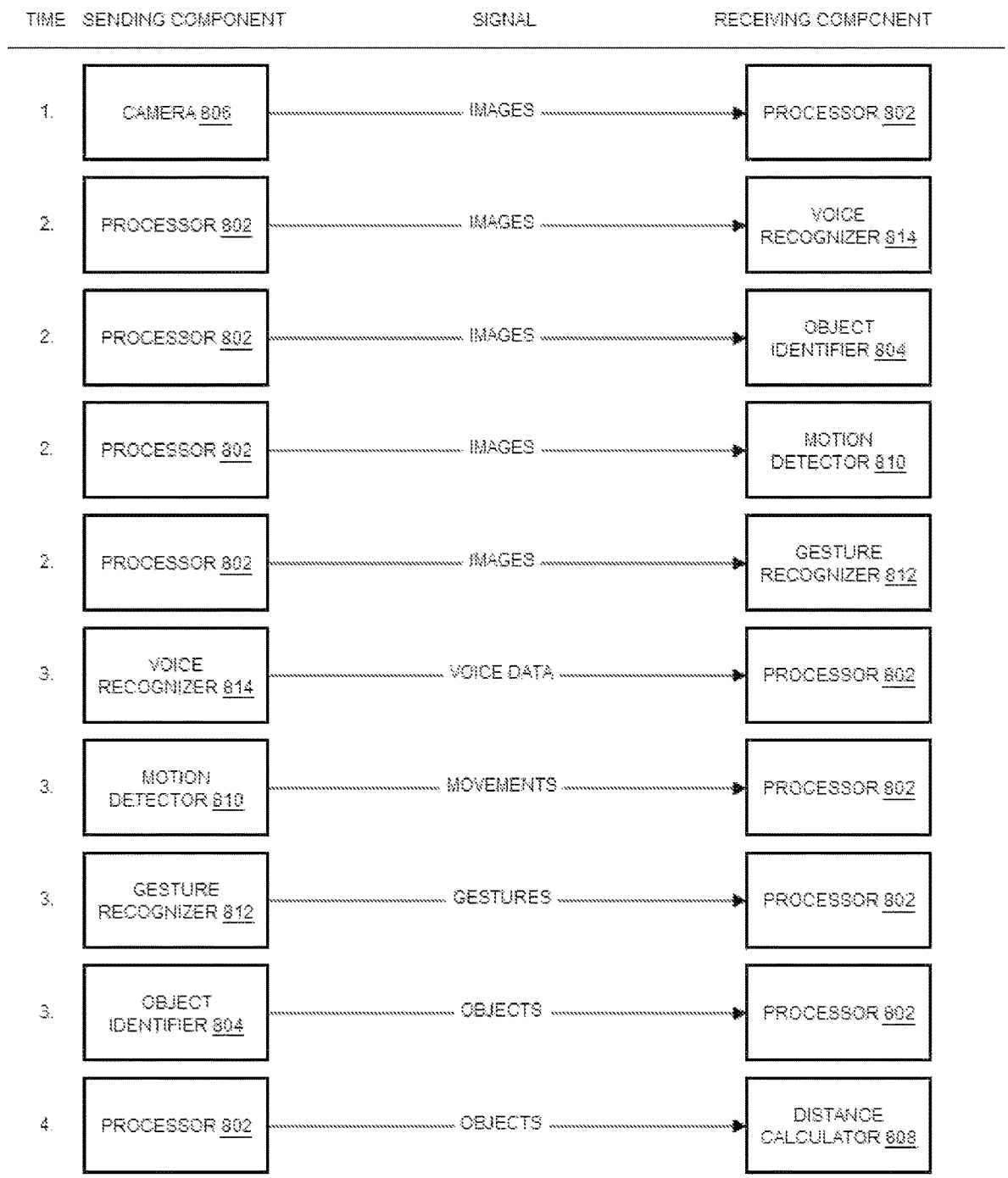
FIG. 10 is an action flow diagram of an embodiment of a stream forming process.
Figure 11:
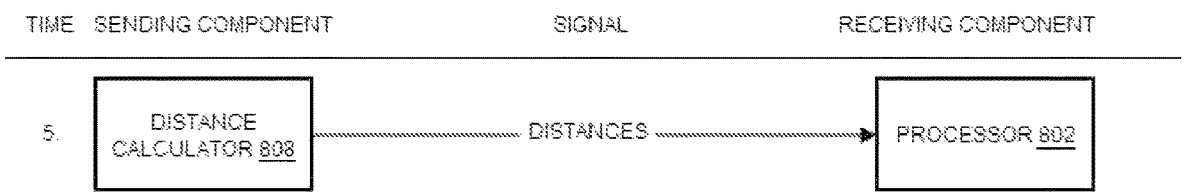
FIG. 11 is an action flow diagram of an embodiment of a stream forming process.
Figure 12:
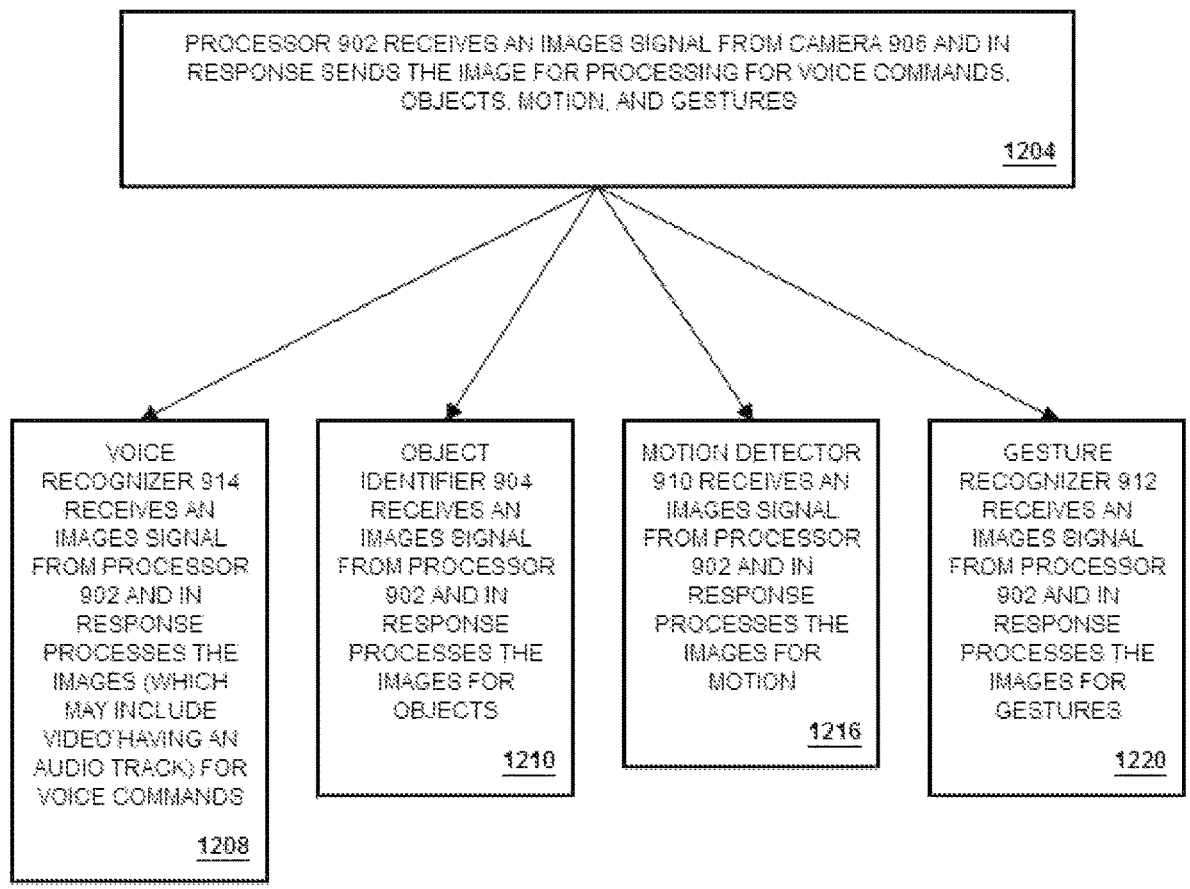
FIG. 12 is a flow chart of an embodiment of a stream forming process.
Figure 13:
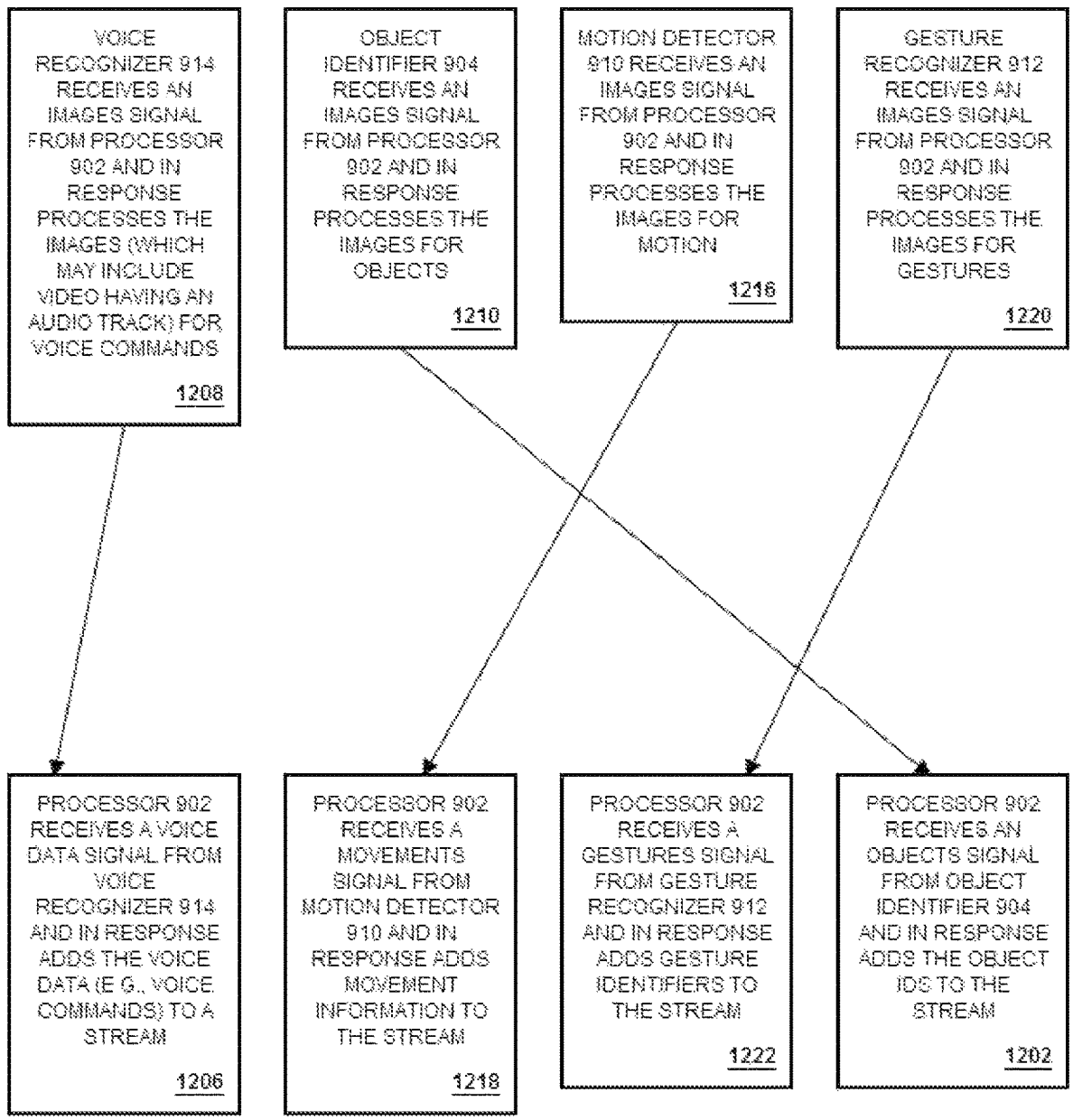
FIG. 13 is a flow chart of an embodiment of a stream forming process.
Figure 14:
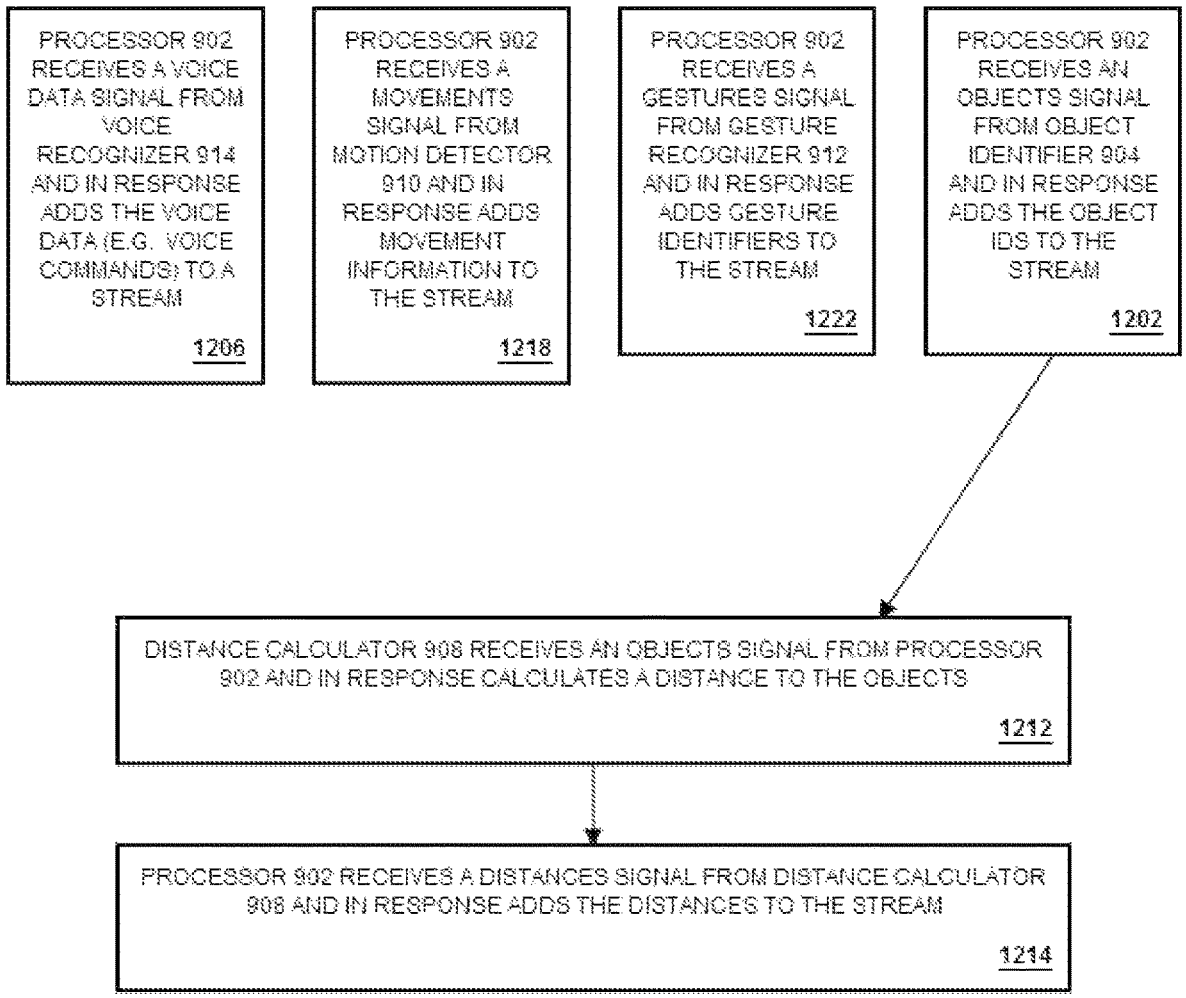
FIG. 14 is a flow chart of an embodiment of a stream forming process.

FIG. 9 is a system diagram of an embodiment of a stream forming device. FIG. 10-11 is an action flow diagram of an embodiment of a stream forming process. FIG. 12-14 is a flow chart of an embodiment of a stream forming process. The system comprises processor 902, object identifier 904, camera 906, distance calculator 908, motion detector 910, gesture recognizer 912, and voice recognizer 914. The processor 902 receives an images signal from camera 906 and in response sends the image for processing for voice commands, objects, motion, and gestures (1204). The voice recognizer 914 receives an images signal from processor 902 and in response processes the images (which may include video having an audio track) for voice commands (1208). The object identifier 904 receives an images signal from processor 902 and in response processes the images for objects (1210). The motion detector 910 receives an images signal from processor 902 and in response processes the images for motion (1216). The gesture recognizer 912 receives an images signal from processor 902 and in response processes the images for gestures (1220). The processor 902 receives a voice data signal from voice recognizer 914 and in response adds the voice data (e.g., voice commands) to a stream (1206). The processor 902 receives a movements signal from motion detector 910 and in response adds movement information to the stream (1218). The processor 902 receives a gestures signal from gesture recognizes 912 and in response adds gesture identifiers to the stream (1222). The processor 902 receives an objects signal from object identifier 904 and in response adds the object ids to the stream (1202). The distance calculator 908 receives an objects signal from processor 902 and in response calculates a distance to the objects (1212). The processor 902 receives a distances signal from distance calculator 908 and in response adds the distances to the stream (1214).

Figure 15:
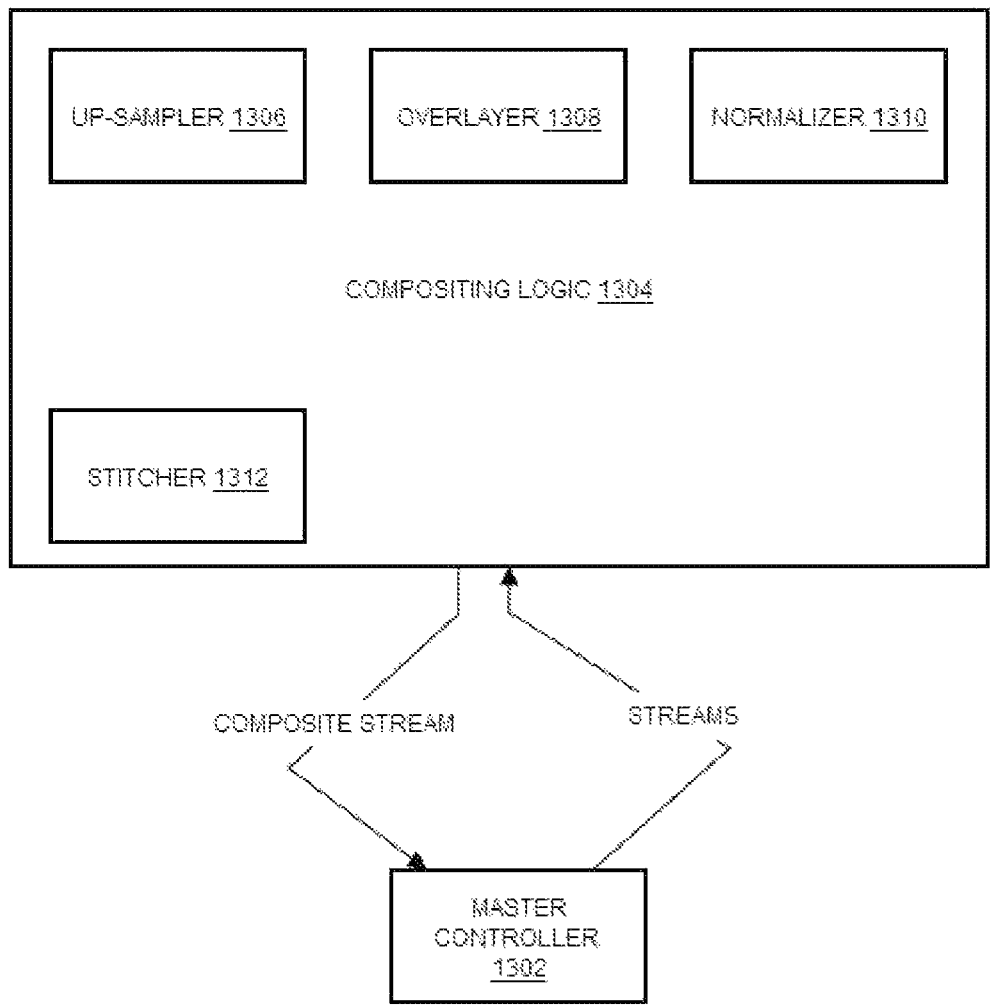
FIG. 15 is a system diagram of an embodiment of an image compo siting system.
Figure 16:
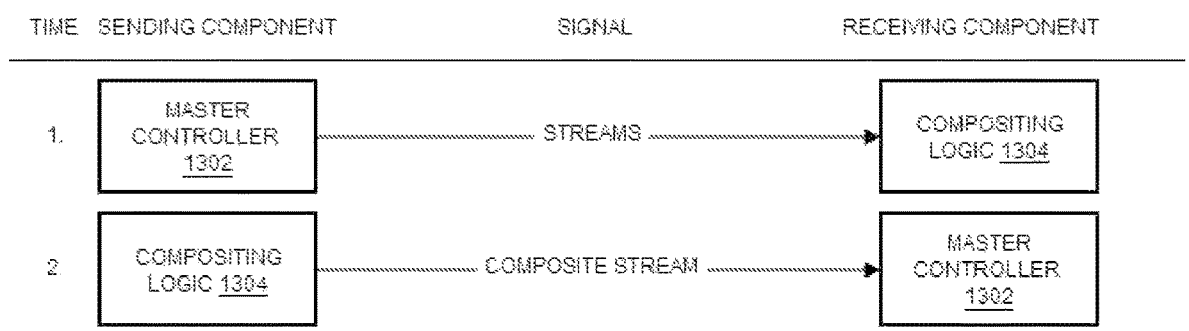
FIG. 16 is an action flow diagram of an embodiment of image compositing process.
Figure 17:
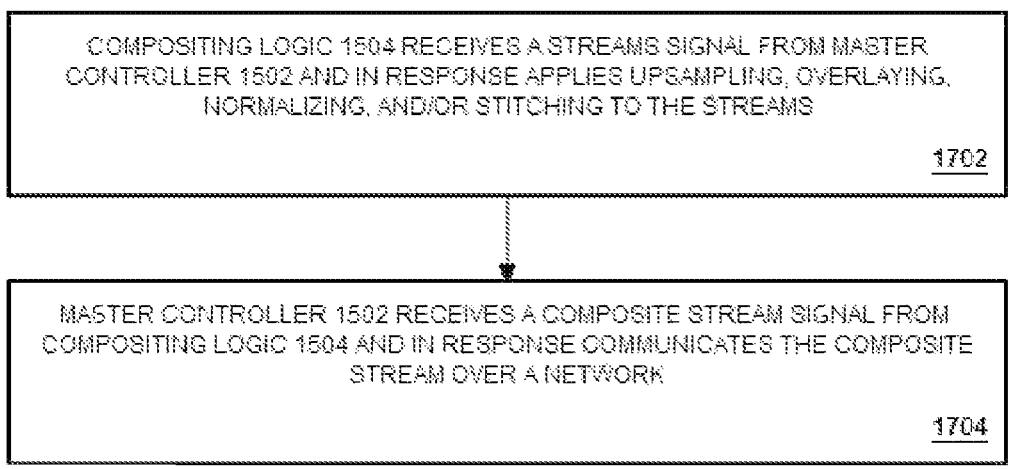
FIG. 17 is a flow chart of an embodiment of an image compositing process.

FIG. 15 is a system diagram of an embodiment of an image compositing system. FIG. 16 is an action flow diagram of an embodiment of image compositing process. FIG. 17 is a flow chart of an embodiment of an image compositing process. The system comprises master controller 1502, compositing logic 1504, up-sampler 1506, overlayer 1508, normalizer 1510, and stitches 1512. The compositing logic 1504 receives a streams signal from master controller 1502 and in response applies upsampling, overlaying, normalizing, and/or stitching to the streams (1702). The master controller 1502 receives a composite stream signal from compositing logic 1504 and in response communicates the composite stream over a network (1704).

What is claimed is:

1. A camera system, comprising:
an array of cameras including a first group of one or more cameras and a second group of one or more cameras, wherein each camera of the array of cameras includes a sensor and a lens, wherein the lenses of the first group of cameras are heterogeneous in comparison to the lenses of the second group of cameras, and wherein the array of cameras form a federated camera device that is configured to emulate a mechanical pan-tilt-zoom camera; and
a processor communicatively coupled to the array of cameras, wherein the processor is configured to:
receive control signals requesting one or more views from the cameras;
based on the control signals, selectively signal the cameras of the first group to capture images in accordance with a certain magnification and the cameras of the second group to capture images in one or more directions;
coalesce output streams containing images from the cameras of the first group and the cameras of the second group to provide an integrated stream in accordance with the requested view associated with the control signals.

2. The camera system of claim 1, wherein the lenses of the cameras of the first group have higher magnification capabilities in comparison to those of the lenses of the cameras of the second group.

3. The camera system of claim 1, wherein the lenses of the cameras of the second group are wide-angle lenses and the images captured by the cameras of the second group are peripheral images.

4. The camera system of claim 1, further comprising a tracking system configured to detect people and objects from the images captured by the array of cameras.

5. The camera system of claim 4, further comprising a distance calculator configured to determine a distance from the array of cameras to the people and objects from the images captured by the array of cameras.

6. The camera system of claim 1, wherein at least one of the cameras of the first group or the second group is configured to capture infrared images.

7. The camera system of claim 6, wherein the processor is further configured to convert the received control signals into control signals with individual settings for at least some of the cameras of the first group or the second group.

8. The camera system of claim 7, wherein the individual settings include settings associated with focus, zoom, pan, tilt, or spectral operations.

9. The camera system of claim 1, wherein each camera of the array of cameras has an associated lens mount configured to accept lenses of different types to permit the lens of each camera to be replaced with a different lens.

10. A camera system, comprising:
a plurality of cameras, wherein each camera of the plurality of cameras includes a sensor and a lens and is configured to be individually controlled, and wherein the plurality of cameras form a federated camera device that is configured to emulate a mechanical pan-tilt-zoom camera; and
a processor communicatively coupled to the plurality of cameras, wherein the processor is configured to:
receive a control signal requesting one or more views from the plurality of cameras;
translate the received control signal into a plurality of control signals with individual camera-operating settings to be selectively directed to the plurality of cameras to configure one or more operational settings of the plurality of cameras in accordance with the received control signal requesting the one or more views from the plurality of cameras; and
coalesce output streams containing images from the plurality of cameras to provide an integrated stream in accordance with the requested view associated with the received control signal.

11. The camera system of claim 10, wherein the plurality of cameras includes a first group of one or more cameras and a second group of one or more cameras and wherein the lenses of the first group of cameras are heterogeneous in comparison to the lenses of the second group of cameras.

12. The camera system of claim 11, wherein the first group of cameras are positioned closer to a center of the plurality of cameras in comparison to the second group of cameras and wherein the lenses of the first group of cameras are configured as telephoto lenses and the lenses of the second group of cameras are configured as wide-angle lenses.

13. The camera system of claim 12, further comprising a tracking system configured to identify people and objects from the images captured by the plurality of cameras.

14. The camera system of claim 13, wherein the images from which the people and objects are identified are from the first group of cameras of the plurality of cameras.

15. The camera system of claim 10, wherein the individual camera-operating settings include settings associated with focus spectrum, magnification, or zoom.

16. The camera system of claim 10, further comprising a tracking system configured to identify people and objects from the images captured by the plurality of cameras.

17. A method of operating a plurality of cameras, comprising:
- receiving control signals requesting one or more views from a plurality of cameras, wherein the plurality of cameras form a federated camera device that is configured to emulate a mechanical pan-tilt-zoom camera;
- translating the requesting control signals into control signals with one or more operational settings associated with a focus, spectrum, or zoom operation of the plurality of cameras;
- selectively directing the control signals with the operational settings to the plurality of cameras on an individual basis for individual control of the plurality of cameras receiving the control signals with the operational settings;
- receiving output streams from the cameras receiving the control signals with the operational settings, wherein the output streams include images from the plurality of cameras; and
- coalescing the output streams from the plurality of cameras into an integrated output stream that is based on the requesting control signals.

18. The method according to claim 17, further comprising identifying people or objects from the images from the cameras.

19. The method according to claim 17, further comprising:
- receiving output streams from the cameras that have not received the control signals with the operational settings; and
- coalescing the output streams from the cameras that have not receive the control signals with the operational settings with those that have received the control signals with the operational settings into the integrated output stream that is based on the requesting control signals.

* * * * *